March 11, 1947.  R. S. GREGOIRE  2,417,107
OIL SEAL
Filed March 19, 1945
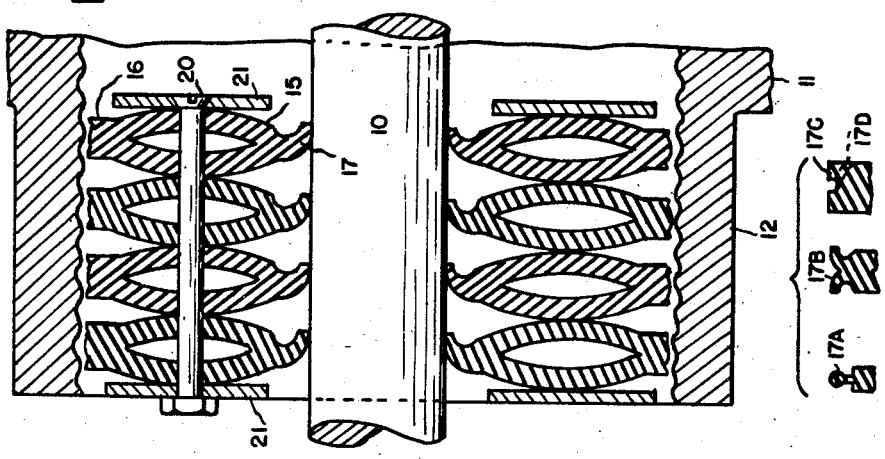
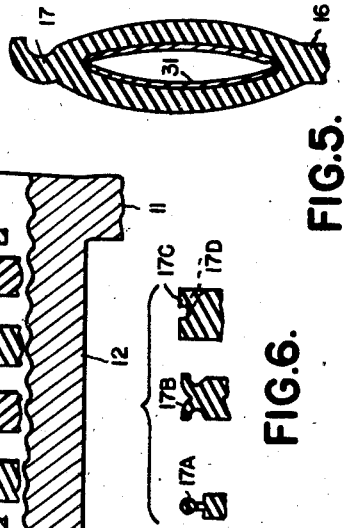
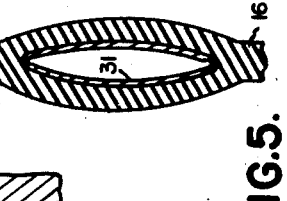
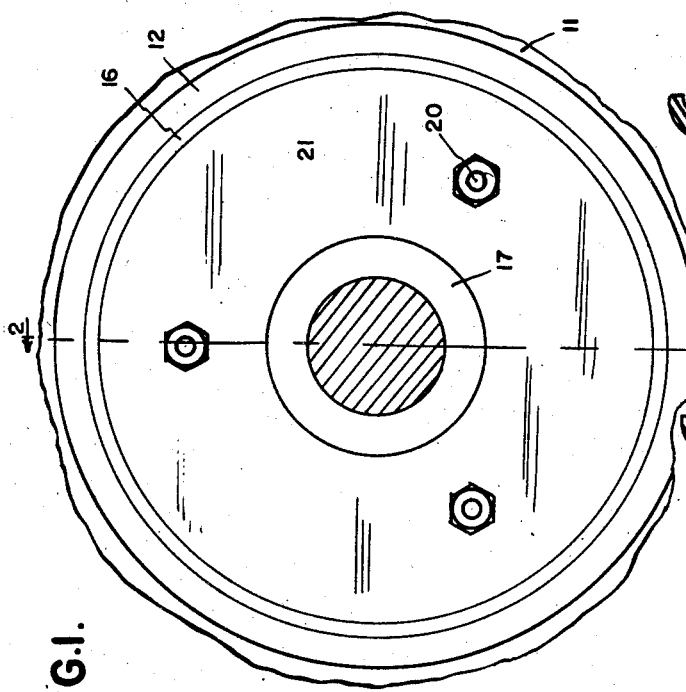
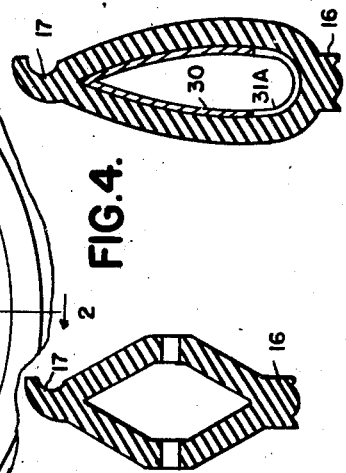
INVENTOR.
RESTA S. GREGOIRE
BY
*Swan, Frye, & Hardesty*
ATTORNEYS Patented Mar. 11, 1947

2,417,107

UNITED STATES PATENT OFFICE 2,417,107

OIL SEAL

Resta S. Gregoire, Detroit, Mich., assignor of twenty per cent to Harold L. Cox and twenty per cent to John Joseph Thornton, Jr., both of Detroit, Mich.

Application March 19, 1945, Serial No. 583,463

2 Claims. (Cl. 286—39)

The present invention relates to oil seals for rotatable shafts extending through the walls of housings or the like.

Among the objects of the invention is an oil seal which is effective, simple in construction and application, and produces a minimum of friction on the rotating part.

Another object is an oil seal which is adjustable in its lateral pressure against the adjacent parts.

Still another object is an oil seal which is effective though used for shaft openings provided with unfinished surfaces.

Other objects and advantages will be apparent to those skilled in the art upon reference to the following description and the accompanying drawing in which Figure 1 is an end elevation of the structure of Figure 2, as from the left of the latter.

Figure 2 is a vertical central section on the line 2—2 of Figure 1.

Figures 3, 4 and 5 are sectional views showing alternate forms of sealing rings.

Figure 6 shows a group of part sections of rings illustrating proposed forms for the shaft contacting portions of the rings.

The drawing, in Figures 1 and 2, shows a preferred form of seal surrounding a shaft 10 extending through a wall 11 provided with a tubular boss 12. Within the boss 12 and surrounding the shaft 10 is shown the seal unit and in Figure 2 this unit is indicated as made up of a plurality of annular members 15 which in section are shown to be hollow, axially flattened and provided on their outer peripheries with a foot piece 16 and on their inner periphery with a flexible or radially, more easily compressible ring portion 17.

These annuli 15 are preferably molded of oil-resistant rubber like material such as that marketed under the name "Neoprene" and are perforated for the reception of a plurality of bolts 20 adapted to pass in an axial direction through the annuli and through a suitable annular plate 21 at either end of the group. Three of such bolts are shown and, while a greater or lesser number of such bolts may be used, three will in most cases be preferable.

The use of bolts 20 and plates 21 provides for axially directed pressure on the annuli 15 which, when such pressure is applied, expand radially in both directions to press them against the wall of boss 12 and against the shaft 10. The plates and bolts, of course, seal the springs in the annuli.

The preferred form of inner ring portion 17 is shown in Figures 2 to 5 as of flexible hook-shaped form (when seen in section). Other forms, however, may be used as indicated in Figure 6, such as the circular bead 17A, the double hook 17B or the double channeled form 17C. This latter may or may not be provided with oil drains 17D from the channel.

Further, the annuli 15 may be given a somewhat different form if desired. The form shown in Figure 3 is substantially the same as that of Figure 2, except that it is somewhat thicker.

Figures 4 and 5 show the annuli to be molded upon thin walled hollow metal cores 30 and 31, the core 30 being indicated as being provided with radial notches or saw cuts 31A. These cores may be made of either a spring metal or of softer non-resilient metal such as aluminum. If of the former, some means of maintaining pressure, such as bolts 20, must be used. If a non-resilient metal is used, they may be compressed and will maintain their position indefinitely.

The chief difference between cores 30 and 31, however, is their shape. This difference in shape produces a difference in the amount of radial expansion inwardly and outwardly. For example, when the annulus of Figure 4 is compressed axially, the foot 16 moves radially a lesser distance than the portion 17. With the form of Figure 5 the movement is substantially the same for both 16 and 17.

In installing the seal, axial compression of any of the forms shown will cause the foot piece 16 to press tightly against the adjacent wall and produce the seal for this portion while the lip 17 bears against the shaft and produces the seal at the inner periphery.

I claim:

1. An oil seal for a shaft opening in a housing, said seal comprising an annulus of resilient oil resistant material provided on its outer periphery with a wall contacting extension and on its inner periphery with a flexible shaft contacting extension, said annulus being molded upon a hollow thin-walled metallic core whose cross sectional dimension axially is considerably less than its radial dimension and with bowed walls whereby axial compression will expand said cored annulus radially in both directions.

2. An oil seal for a shaft passing through a wall, said seal consisting of a plurality of hollow annuli of flexible oil resistant material surrounding said shaft and provided on their outer peripheries with wall contacting ribs and on their inner peripheries with flexible shaft contacting ribs, an annular plate at each end of said group of annuli and a plurality of bolts passing through said plates and annuli parallel to said shaft.

RESTA S. GREGOIRE.

REFERENCES CITED

The following references are of record in the file of this patent:

UNITED STATES PATENTS

| Number | Name | Date |
|---|---|---|
| 2,306,160 | Freyssinet | Dec. 22, 1942 |

FOREIGN PATENTS

| Number | Country | Date |
|---|---|---|
| 12,006 | British | July 31, 1890 |